United States Patent [19]

Delwel et al.

[11] Patent Number: 5,340,559
[45] Date of Patent: Aug. 23, 1994

[54] GRANULAR ALKALI METAL SILICATE PRODUCTION

[75] Inventors: Francois Delwel, Dordrecht; Theo J. Osinga, Cadier en Keer; Joseph P. Theunissen, Eysden; Jack M. Vrancken, Maastricht, all of Netherlands

[73] Assignee: Unilever Patent Holdings B.V., Vlaardingen, Netherlands

[21] Appl. No.: 908,707

[22] Filed: Jul. 2, 1992

[30] Foreign Application Priority Data

Jul. 2, 1991 [EP] European Pat. Off. ........ 91305996.0

[51] Int. Cl.$^5$ .............................................. C01B 33/32
[52] U.S. Cl. .................................... 423/334; 423/332
[58] Field of Search ................ 423/332, 333, 334

[56] References Cited

U.S. PATENT DOCUMENTS

| | | | |
|---|---|---|---|
| 3,687,640 | 8/1972 | Sams et al. | 423/332 |
| 3,838,192 | 9/1974 | Bertorelli et al. | 423/332 |
| 3,868,227 | 2/1975 | Gericke et al. | 423/332 |
| 4,253,849 | 3/1981 | Vrisakis et al. | 423/332 |

Primary Examiner—Olik Chaudhuri
Assistant Examiner—Ken Horton
Attorney, Agent, or Firm—Cushman, Darby & Cushman

[57] ABSTRACT

Alkali metal silicate solutions are formed into granules in a single stage. The heated solution is sprayed into a heated drum having a multiplicity of arms fixed to a rapid by rotating central shaft. A gas, preferably air, heated to 150° C. to 200° C. is also introduced with the silicate solution and a granulated product is obtained from the other end of the drum.

10 Claims, 1 Drawing Sheet

GRANULAR ALKALI METAL SILICATE PRODUCTION

FIELD OF THE INVENTION

This invention relates to the preparation of alkali metal silicate granules suitable for incorporation in detergent formulations. The process uses alkali metal silicate solution as the feedstock.

BACKGROUND OF THE INVENTION

Detergent compositions intended for mechanical dishwashing will usually require a component capable of providing a considerable alkalinity in the wash liquor. Alkali metal silicates having a $SiO_2/M_2O$ molar ratio from about 1.5:1, preferably from 1.8:1, to about 3.3:1, preferably to 2.2:1, are particularly suitable for this purpose and also they protect glassware from corrosion.

Fabric washing compositions also require the presence of alkali metal silicates and market pressures are driving such compositions towards the use of higher bulk density products. Usually such compositions will have a bulk density above 700 g/l, preferably above 850 g/l and more preferably up to 1.0 kg/l. Typically these compositions are prepared free of phosphates and this route will require the presence of another builder, e.g. zeolites. The latter component, when spray dried in a slurry containing silicates forms insoluble agglomerates and thus there is a need to post dose silicates of appropriate bulk density. Alkali metal silicates formed separately in powder form or into granules in a spray drying step have lower bulk densities e.g. ca 650 g/liter, have a tendency to cake and are dusty.

Alkali metal silicate in granular form can be formed by a compaction process using the procedures described in U.S. Pat. No. 3,875,282 (Stauffer Chemical Co) and U.S. Pat. No. 3,931,036 (Philadelphia Quartz Co). A bulk density of ca 900 g/l is obtainable but the particle shape is not optimum because it derives from a broken compressed slat; additionally fines are produced from the particle edges by interparticle collision during handling. In practice a maximum bulk density of only about 850 g/l can be achieved with a compaction process.

SUMMARY OF THE INVENTION

The invention provides a method in which a solution containing about 30% to about 53% w/w of alkali metal silicate, preferably 40% to 53% w/w, with a $SiO_2:M_2O$ molar ratio in the range 1.5:1 to 3.3:1, preferably 1.8 to 2.2:1, more preferably 1.9:1 to 2.1:1 and most preferably about 2.0:1 is formed into granules having an average particle size in the range from about 0.2 mm to about 2 mm in a single drying and granulation stage wherein the silicate solution is introduced into a drum containing a multiplicity of rotating arms proximate its internal surface, which has a temperature from about 150° C. to about 200° C., and gas is introduced into the drum at a temperature in the range from about 175° C. to about 250° C. Preferably the gas is introduced near the location where the silicate solution is introduced. In this way the liquid and gas enter the drum cocurrently, which provides an advantageous temperature distribution throughout the drum i.e. from a relatively high temperature where a large amount of liquid is present to a relatively low temperature where granules are completed. The gas used is not critical although it must not interact with the silicate solution, preferably air is used.

Preferably the silicate liquor is introduced in the upper region of one side of the drum and the gas is introduced into the lower region of the drum. The usual alkali metal will be sodium and the present invention is specifically directed to sodium silicate. However this method is also capable of granulating potassium and lithium silicates.

A particular feature of the method is that fine and coarse sieve fractions falling outside the desired range of 0.2 mm to 2 mm can be recycled in the silicate solution. These fractions can be added to the silicate solution without further processing, e.g. milling, and will be recycled even if they are not able to dissolve in the solution. Preferably the granules with an average particle size of below 0.2 mm are recycled by introduction thereof into the drum with or adjacent to the gas stream, by which caking on the wall of the drum is minimized.

DETAILED DESCRIPTION OF THE INVENTION

Figure 1:
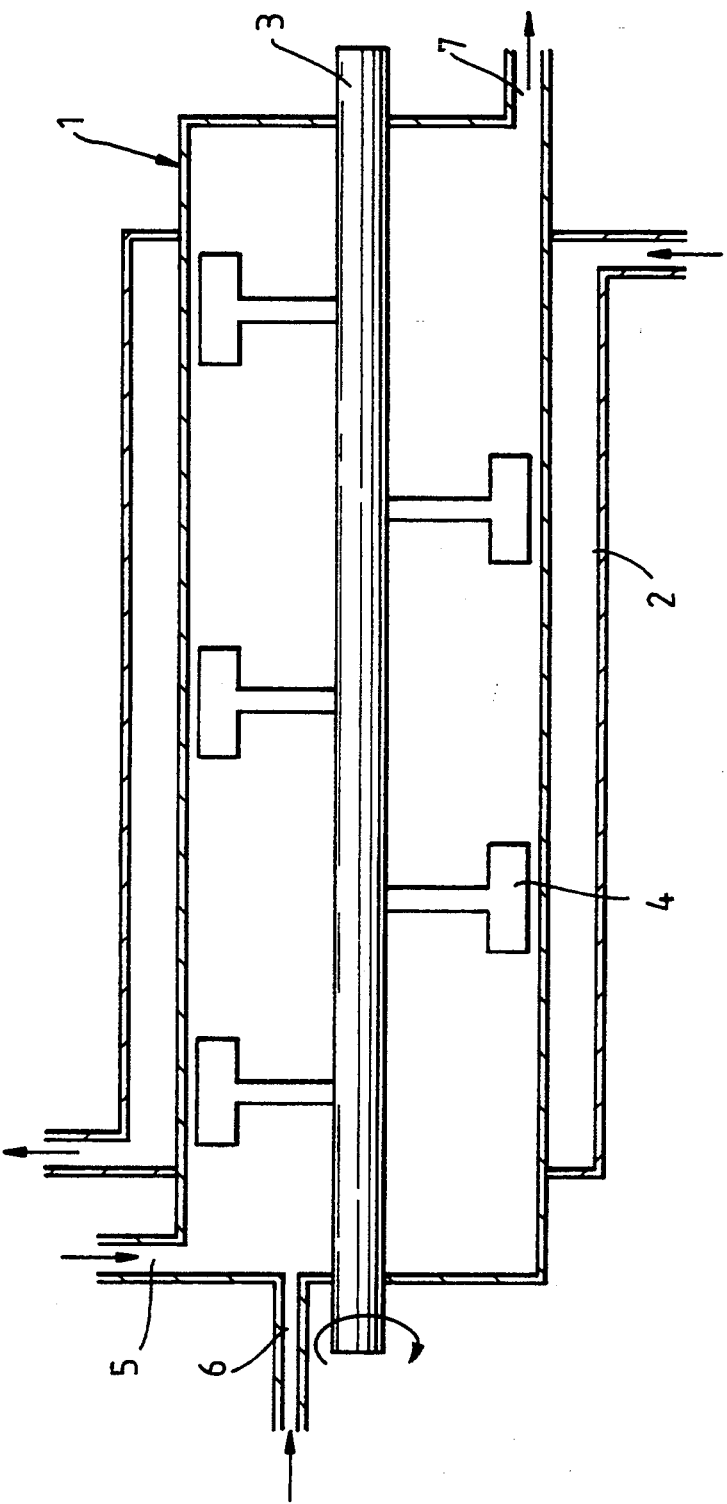
FIG. 1 illustrates one embodiment of the invention for forming granular silicates in a tubular drum provided with internal rotating paddles for agitating the contents of the drum.

Classes of detergent formulations of higher bulk densities, i.e. above 850 g/l, are those formulations intended for use in mechanical dishwashers and in fabric washing. The bulk densities can be considerably above the level quoted but usually they will not exceed 1000 g/l. The preparation of detergent powders having relatively high bulk density is described in a number of patent specifications. Thus EPA 0367339 (Unilever) describes a two step procedure utilising in sequence a high speed mixer densifier and a moderate speed granulator densifier. The process described utilises a particular starting material. In EPA 0220024 (Procter & Gamble) a process is described utilising a spray dried detergent powder as feedstock which is subjected to compaction using a roll compacter. In general the detergent formulations to which the present invention is applicable will contain from about 0.1% to about 40% by weight of surfactant, from about 10% to about 70% by weight, preferably 20% to 50% by weight, of detergency builder; for example zeolites, citrates, NTA.

The present invention provides a method which allows formation of alkali metal silicate granules in a single stage process. These silicates can be prepared with the necessary higher bulk density and physical properties suitable for mechanical dishwashing detergents and for post addition in fabric washing detergents.

Additionally the detergent formulations may contain polymeric materials to stabilise ingredients or give beneficial results during the washing procedure, e.g. suspension of soil. Furthermore they can promote dispersion of components present in the wash liquor i.e. fluorescers, germicides and, in particular, silicate components. In addition to providing a degree of alkalinity in the wash liquor the silicate components also act to reduce corrosion in washing machines and protect glass against the effects of high alkalinity in dishwashing.

In general there is no restriction on the detergent active material or detergency builders which may be utilised with alkali metal silicate granules of the present invention. Thus the detergent actives, also termed surfactants, may be selected from anionic, nonionic, ampholytic, zwitterionic materials or mixtures thereof. The artionic and nonionic surfactants can be utilised alone or as mixtures. Examples of suitable surfactants are water soluble alkaline metal salts of organic sulphates and sulphonates having C8 to C22 alkyl radicals. Alkyl sulphates may be obtained by sulphating higher, C8 to C18, alcohols obtained from natural sources e.g. tallow or coconut oil. Sodium and potassium alkyl (C9 to C20) benzene sulphonates, and specially sodium linear secondary alkyl (C10 to C15) benzene sulphonates, are preferred surfactants. Suitable nonionic surfactants include the reaction products of compounds having a hydrophobic group and a reactive hydrogen atom, e.g. aliphatic alcohols, acids, amides or alkyl phenols with alkylene oxides, especially ethylene oxide alone or with propylene oxide.

Test Methods

Bulk density: A cylinder (height/diameter ratio of approximately 2) is filled with powder to to a measured volume ca 1 liter and the sample weighed.

Ball mill friability (BMF): This measures the breakdown of granules under conditions representing high shear mixing.

The sample of granulate is sieved to remove oversize (>1200 μm) and undersize (<200 μm) and then split into two parts. One part is used to measure the size distribution by sieving. The other part is put in the ball mill.

The ball mill is a 10×10 cm cylinder, containing 50 porcelain balls of 1 cm diameter and operated at 90 rpm, while set at a declination of 16 degrees. After 5 minutes milling the sample is removed and sieved to determine the size distribution. Ball mill friability is expressed as the percentage increase in fines <200 μm.

Particle size: Measured using standard sieves (Retsch).

Specific Example of the Invention

An example of the method of the invention will now be given to illustrate but not limit the invention. A vertical diagrammatic section through the granulation apparatus is shown in FIG. 1.

The apparatus used comprised a double walled tubular drum 1 mounted horizontally. Heated oil was passed through the double wall cavity 2 to heat the inner surface of the drum to a required temperature. The drum had a length of 2 meters and a diameter of 0.35 meters. Along the cylindrical axis was positioned a rotatable shaft 3 having about 100 arms 4 equally spaced along its length with 4 arms fixed at each contact point. These arms have paddle ends which extend to be almost in contact with the inner wall. The shaft was rotated at 1100 rotations per minute.

Sodium silicate solution having a $SiO_2/Na_2O$ molar ratio of 2:1 and a density of 1.56 kg/liter, i.e. 46% w/w, was sprayed into the drum at an inlet 5 just above the axis at one side of the drum at a rate of about 110 liters/hour and at a temperature of 60° C. Air heated to 220° C. by a heat exchanger entered the drum at a rate of 700 m³/hour at an inlet 6 next to the axis and close to the point where the silicate liquor was introduced at the same end of the drum. The granular silicate product and air left the drum at the other end of the drum through conduit 7. The drum wall temperature was maintained at 175° C.

The silicate solution was rapidly broken into droplets by the force of the air movement and then impacted against the drum wall by the rotational energy of the paddles. The droplets were continuously impacted with the wall as they progressed through the drum under the force of the air.

The silicate product was drawn off at the lowest point of the drum and was found to be substantially spherical particles having a particle size distribution of below 200 micron    40% by wt
200 to 1,000 micron    50% by wt
above 1,000 micron    10% by wt The product did not stick to the drum wall or the moving parts and was free flowing. It had a water content of 22% w/w, a bulk density of 1.0 kg/liter and a Ball Mill attrition of below 0.5% for particles above 200 micron. It was sieved to provide the desired product with a particle range of 0.2 mm to 2.0 mm after separation from the air and steam by means of a cyclone. The particles outside this range were recycled by addition to the silicate solution.

In a comparative example the silicate solution was introduced into the drum at ambient temperature, the drum wall was maintained at 250° C. and the drying air temperature was 300° C. This product had a bulk density in the range 400 to 500 g/liter and was a glassy, flake type product with poor flow properties. It broke down easily when subjected to attrition.

The points of dosing the silicate solution and air into the drum are not critical provided the solution and air are contacted so as to break the former into droplets. Thus the solution can be sprayed into the drum or introduced in bulk to allow the air stream to break it into droplets. The solution and air streams can be introduced at the flat end wall or through the cylindrical side wall.

The recycled fines can be introduced with or adjacent the air stream so as to obtain fluidization of the fines before the airstream contacted the silicate solution. This procedure minimizes caking on the wall.

We claim:

1. A method of preparing alkali metal silicate granules in which a solution containing about 30% to about 53% w/w of alkali metal silicate with a $SiO_2:M_2O$ molar ratio in the range 1.5:1 to 3.3:1 is formed into granules having an average particle size in the range from about 0.2 mm to about 2 mm in a single evaporating and granulation stage wherein the silicate solution is introduced into a drum containing a multiplicity of rotating arms proximate its internal surface, which has a temperature from about 150° C. to about 200° C., and a gas is introduced into the drum at a temperature in the range from about 175° C. to about 250° C.

2. A method of preparing alkali metal silicate granules in which a solution containing about 40% to about 53% w/w of alkali metal silicate with a $SiO_2:M_2O$ molar ratio in the range 1.5:1 to 3.3:1 is formed into granules having an average particle size in the range from about 0.2 mm to about 2 mm in a single evaporating and granulation stage wherein the silicate solution is introduced into a drum containing a multiplicity of rotating arms proximate its internal surface, which has a temperature from about 150° C. to about 200° C., and a gas is introduced into the drum at a temperature in the range from about 175° C. to about 250° C.

3. A method according to claim 1 or 2, characterized in that the gas is introduced near the location where the silicate solution is introduced.

4. A method according to claim 1 wherein the silicate solution is introduced into an upper region of the drum and the gas is introduced into a lower region of the drum.

5. Method according to claim 4 wherein the gas is air.

6. A method according to claim 1 wherein the silicate has a molar ratio of $SiO_2:M_2O$ from 1.8:1 to 2.2:1.

7. Method according to claim 6 wherein the silicate has a molar ratio of $SiO_2M_2O$ from 1.9:1 to 2.1:1.

8. A method according to claim 1 wherein the alkali metal silicate is sodium silicate.

9. Method according to claim 1 wherein granules with an average particle size of below 0.2 mm and about 2 mm are recycled.

10. Method according to claim 9 wherein granules with an average particle size of below 0.2 mm are recycled by introduction thereof into the drum with or adjacent to the gas stream.

* * * * *